(12) United States Patent
Salz et al.

(10) Patent No.: US 7,809,698 B1
(45) Date of Patent: Oct. 5, 2010

(54) SYSTEM AND METHOD REMAPPING IDENTIFIERS TO SECURE FILES

(75) Inventors: Richard E. Salz, Georgetown, MA (US); Eugene Kuznetsov, Cambridge, MA (US); Cyrus A. Dolph, Cambridge, MA (US); William T. Lynch, Newton Highlands, MA (US); Anthony M. French, South Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1585 days.

(21) Appl. No.: 10/746,300

(22) Filed: Dec. 24, 2003

Related U.S. Application Data

(60) Provisional application No. 60/436,620, filed on Dec. 24, 2002.

(51) Int. Cl.
*G06F 7/00* (2006.01)
*G06F 15/16* (2006.01)
(52) U.S. Cl. .................. 707/694; 707/927; 715/237
(58) Field of Classification Search .............. 707/1, 707/102, 2, 10, 694, 927; 709/200; 715/234, 715/237; 1/1
See application file for complete search history.

(56) References Cited

U.S. PATENT DOCUMENTS

| | | | |
|---|---|---|---|
| 6,009,436 A * | 12/1999 | Motoyama et al. | 707/102 |
| 6,591,260 B1 * | 7/2003 | Schwarzhoff et al. | 707/2 |
| 6,928,487 B2 * | 8/2005 | Eggebraaten et al. | 709/246 |
| 7,299,408 B1 * | 11/2007 | Daconta et al. | 715/234 |
| 2002/0184145 A1 * | 12/2002 | Sijacic et al. | 705/40 |
| 2003/0014397 A1 * | 1/2003 | Chau et al. | 707/3 |
| 2003/0037239 A1 * | 2/2003 | Leung et al. | 713/169 |
| 2004/0088321 A1 * | 5/2004 | Fuller et al. | 707/103 Y |
| 2004/0230660 A1 * | 11/2004 | Abjanic et al. | 709/207 |
| 2005/0150953 A1 * | 7/2005 | Alleshouse | 235/432 |

* cited by examiner

*Primary Examiner*—Tony Mahmoudi
*Assistant Examiner*—Dennis Truong
(74) *Attorney, Agent, or Firm*—Chapin IP Law, LLC; Barry W. Chapin, Esq.

(57) ABSTRACT

A flexible system for associating a data stream with one or more secure control files based on mapping self-declared identifiers to trusted identifiers. It has particular application in relation to XML documents, XML Schema, XPath/XSLT/XQuery and WSDL file processing. Control file identifiers are detected in a data stream and transformed to map to new identifiers which are correlated to locations which are more secure and/or accessible. Optionally, copies of the control files are then stored and maintained at the new locations.

23 Claims, 4 Drawing Sheets

SYSTEM AND METHOD REMAPPING IDENTIFIERS TO SECURE FILES

RELATED APPLICATION

The present application claims the benefit of U.S. Provisional Application No. 60/436,620 filed on Dec. 24, 2002, which is incorporated herein by reference.

FIELD OF THE INVENTION

This invention is directed towards processing of control files, and more particularly towards XML document processing.

BACKGROUND

Networks and networked applications have grown dramatically in number, size and complexity over the past decade. One of the more recent data encoding formats enjoying wide adoption, especially on the Internet, has been XML (EXtensible Markup Language), a part of the SGML family of document description languages. XML was developed as a document format protocol or language for the Web that is more flexible than HTML. XML allows tags used to define elements of a page or document to be flexibly defined by the developer of the page. Thus Web pages can be designed to effectively function like database records with selectively defined tags representing data items for specific applications (e.g. product code, department, price in the context of a purchase order or invoice document or page). In the world of Web content, the use of XML is growing as it becomes the preferred data format in both business-to-business (B2B), business-to-consumer (B2C), and peer-to-peer Web commerce sectors (e-business).

The World Wide Web Consortium (W3C) drives the standards for the various interoperable protocols that cover the features and extensions of XML. They include XSL (stylesheet language), XPath (a node selection and query module), XSLT (language for transforming XML), XQuery (a querying language) and XML Schema (create shared vocabularies). XML Schemas express shared vocabularies and provide a means for defining the structure, content and semantics of XML documents. The use of data schemas (such as DTDs, XML Schema, RelaxNG, etc.) allows a set format to be used for all similar transactions. A schema defines the type, order and layout of data for a particular XML format. When an XML schema is defined, then "instance documents" may be instantiated that conform to that particular schema.

An XML document may be validated against one or more XML Schema documents through a process called schema validation. Schema validation is the process of validating the data in the XML document against the structure defined in the XML Schema document. Schema validation requires identifying which element and attribute declarations and type definitions in the schemas should be used to check which elements and attributes in the instance document. If validation is being performed and a document fails validation, it can be rejected without further processing being performed.

In order to validate the document, the schema document must be obtained. The XML document typically will have one or more declarations to appropriate XML Schema documents in its header. A document may specify or hint its schema by using an XML processing instruction (PI), XML Namespace declaration, schema-location attribute or similar special declaration. For example, when using a PI, the value of the PI is the URI of the schema—which is commonly treated as a URL, its location on the web. The processor must therefore obtain these schema documents in order to validate the instance document. Further, these schema documents can include other schema documents, thereby requiring the processor to do multiple fetches on the web to validate a document.

A document's schema may also be specified "out of band," such as through configuration information. This allows one to use a "trusted" copy of the XML Schema document. The trusted copy will typically be located at one specific web address or file location, and any processor wishing to validate that document must fetch the trusted copy of the XML Schema document. This results in higher security at the expense of additional manual configuration and possible lower runtime efficiency.

SUMMARY

The present invention is directed towards a flexible system for associating a data stream with one or more secure control files based on mapping self-declared identifiers to trusted identifiers. It has particular application and novelty in relation to XML documents, SOAP security, XML Schema, Schema-URL/URI processing, XPath/XSLT/XQuery and WSDL file processing.

A control file controls the processing of a chunk of data or supplies additional information that may be useful during the processing of the chunk of data. Examples of control files include: XML schema file, DTD file, ASN.1 file, IDL file (such as Microsoft IDL file), RelaxNG schema file, application server web service deployment descriptor (such as IBM WebSphere service descriptor), XSLT file, XQuery file, XPath routing file, XML Catalog, or other custom files. Control files include such files as configuration files, headers files, etc.

One embodiment of the present invention includes a method of processing a data stream, including monitoring the data stream for control file identifiers, and upon encountering a control file identifier, creating a mapping of the control file identifier to a new storage location for a control file referred to by the control file identifier. The method includes transforming the control file identifier in the data stream to a new control file identifier that refers to the new storage location specified by the mapping, and then passing the data stream on for further processing.

The method can include the step of making a copy of the control file to the new storage location specified by the mapping, and also performing the steps on the control file as performed on the data stream. This method can be performed at run time, before passing the data stream on for further immediate processing.

The control file can include instructions for how to process the data stream. Instructions included in the control file may indicate that under certain conditions, passing the data stream on for further processing should be halted, and alternate data should be passed along for further processing. Also other instructions may indicate that under certain conditions, passing the data stream on for further processing should be halted, and alternate data should be sent back to an originator of the data stream.

The data stream may include data in XML format, and the control file may be an XML Schema file, Data Type Document (DTD) file, RelaxNG file, Web Services Description Language (WSDL) file, W3C XSLT Stylesheet file, W3C XQuery document, or an XML Catalog. The control file may be protected by digital signature or other integrity and authentication mechanisms. A validity indication for the control file may change the processing of the data stream.

The present invention includes a system for processing an incoming data stream in XML format, wherein at least one control file must be obtained in order to validate the incoming data stream, the system. It includes a pre-processor in communication with the incoming data stream, the pre-processor to monitor the incoming data stream for embedded control file identifiers, where upon detecting a control file identifier, the pre-processor transforms the control file identifier into a new file identifier based on a mapping to a storage location different from a storage location indicated by the control file identifier.

The pre-processor can obtain the control file identified by the control file identifier, and stores a copy of the control file in the storage location based on the mapping, and can validate the incoming data stream using the obtained control file. The pre-processor may transform the control file identifier into a new file identifier at run-time, before passing the incoming data stream on for further processing.

The control file may include instructions for how to process the data stream, and the pre-processor, based on the instructions, may halt passing the data stream on for further processing, and pass alternate data instead. Also pre-processor, based on the instructions, may halt passing the data stream on for further processing, and instead send alternate data back to an originator of the data stream.

An embodiment of the present invention includes a network appliance for use as an XML firewall, the network appliance for obtaining at least one XML schema file in order to validate incoming transactions in XML format. The network appliance monitors the incoming transactions in XML format for XML schema file identifiers, and upon detecting an XML schema file identifier, transforms the XML schema file identifier into a new file identifier based on a mapping to a storage location different from a storage location indicated by the XML schema file identifier. The network appliance also obtains the XML schema file identified by the XML schema file identifier and stores the XML schema file in the storage location based on the mapping. It also validates the incoming transaction using the XML schema file.

An embodiment of the present invention includes a data processing module which consumes a (possibly untrusted or misconfigured) data stream and a configuration file, the data stream including means of embedding information in the data steam that associates it with an identifier for a configuration file. It also includes a means of retrieving the control file given its identifier, and a means of mapping an identifier from one namespace into another (including, but not limited to, URL-mapping, URL-rewriting, lookup-tables). The embodiment also includes a pre-processing module which examines the data stream, extracts control file identifier from it, and optionally uses the mapping means to remap the identifier, and further utilizing the means of retrieving the control file to access the control file and then consuming the data stream.

An advantage of the present invention includes a system that is more secure and/or higher performance because it does not have to rely on retrieving arbitrary control files (e.g., XML schemas) from transaction-supplied locations, particularly over the public Internet, and instead allows "trusted" control files to be retrieved from within the trust boundary.

Another advantage of the present invention is that a system is more practical to deploy as it is much easier to configure than the alternative which requires explicit mappings between control files and all possible transaction types. The Invention is a self-configuring system, where each transaction can declare itself to be associated with a specific control file without risk of uncontrolled access to external resources. For example, an embodiment of the invention used for XML Schema validation allows an XML document to declare itself to be "valid" against a specific set of constraints in a specific kind of control or configuration file (an XML Schema, aka XSD, file)—and be verified against a trusted copy of the XML Schema.

Another advantage of the present invention includes the added benefit that transactions which declare themselves to be valid against a control file that is not recognized can be quickly identified and quarantined, as they may be the result of malicious attack, inadvertent data corruption or misconfiguration, or legitimate changes that have not been fully propagated through the processing system.

Yet another advantage of the present invention is that additional flexibility is available by overriding transaction-declared configurations or modifying control files after they are retrieved.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
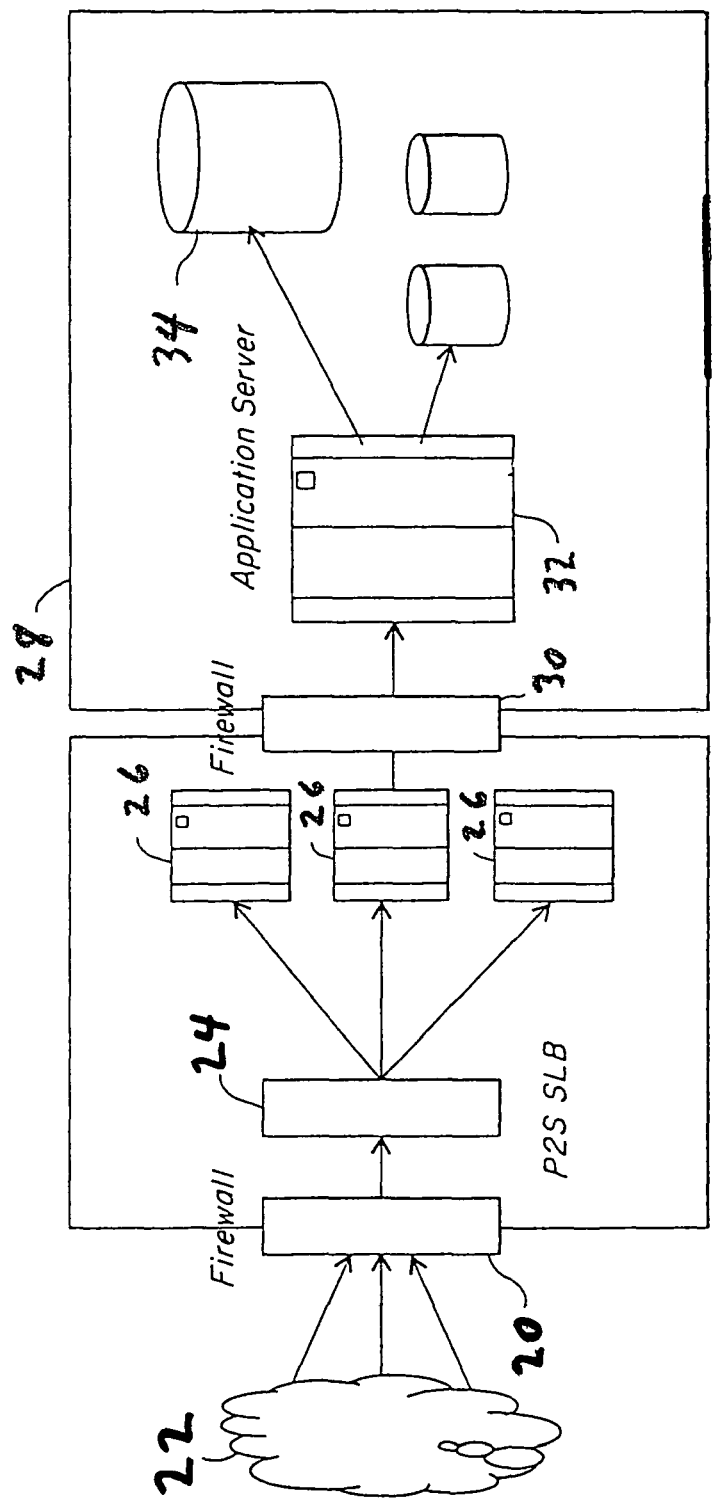
FIG. 1 is a block diagram of a representative network site in which the present invention may be exploited in an XML firewall network device.

FIG. 1 shows an environment in which implementation of the present invention may provide particular advantages, for example a web services business-to-business (B2B) environment over the Internet. Validated customers can access a business through the firewall 20 connected to the Internet 22. Transactions of various kinds (such as information exchanges or purchases) are handled by the front-end interface program 24 which uses the services of a number of back end servers 26 for selected tasks. For example, an Internet user may request a purchase, and the back-end servers determine what the present inventory levels are for the requested items, and whether the user is in the customer accounts database.

In another scenario, the transaction may be a credit card debit in which a back-end server periodically contacts a clearinghouse for verifications or adjustments. In any case, many web-based businesses contract with other operators to provide application services 28. Application services may include, for example, electronic data interchange (EDI) transactions for effecting automated E-commerce, document distribution and publication, or other electronic record transactions. The customer servers 26 communicate through firewall 30 to the application service sites 28, either via the Internet or through other online communication means. The application servers 32 at the application service site 28 interact with local information assets and processes 34 to determine what further transactions may be necessary to fulfill the customer request. The application servers 32 may also use a network elements, such as a routers to reach other application servers in the high-performance portion of the Internet. Because of the disparate data format implementations among different application servers, a data format translation is often required. A system for optimizing such transactions in such an environment is described in Applicant's co-pending patent application Ser. No. 09/733,834 filed on Dec. 8, 2000, which is fully incorporated here by reference.

Figure 2:
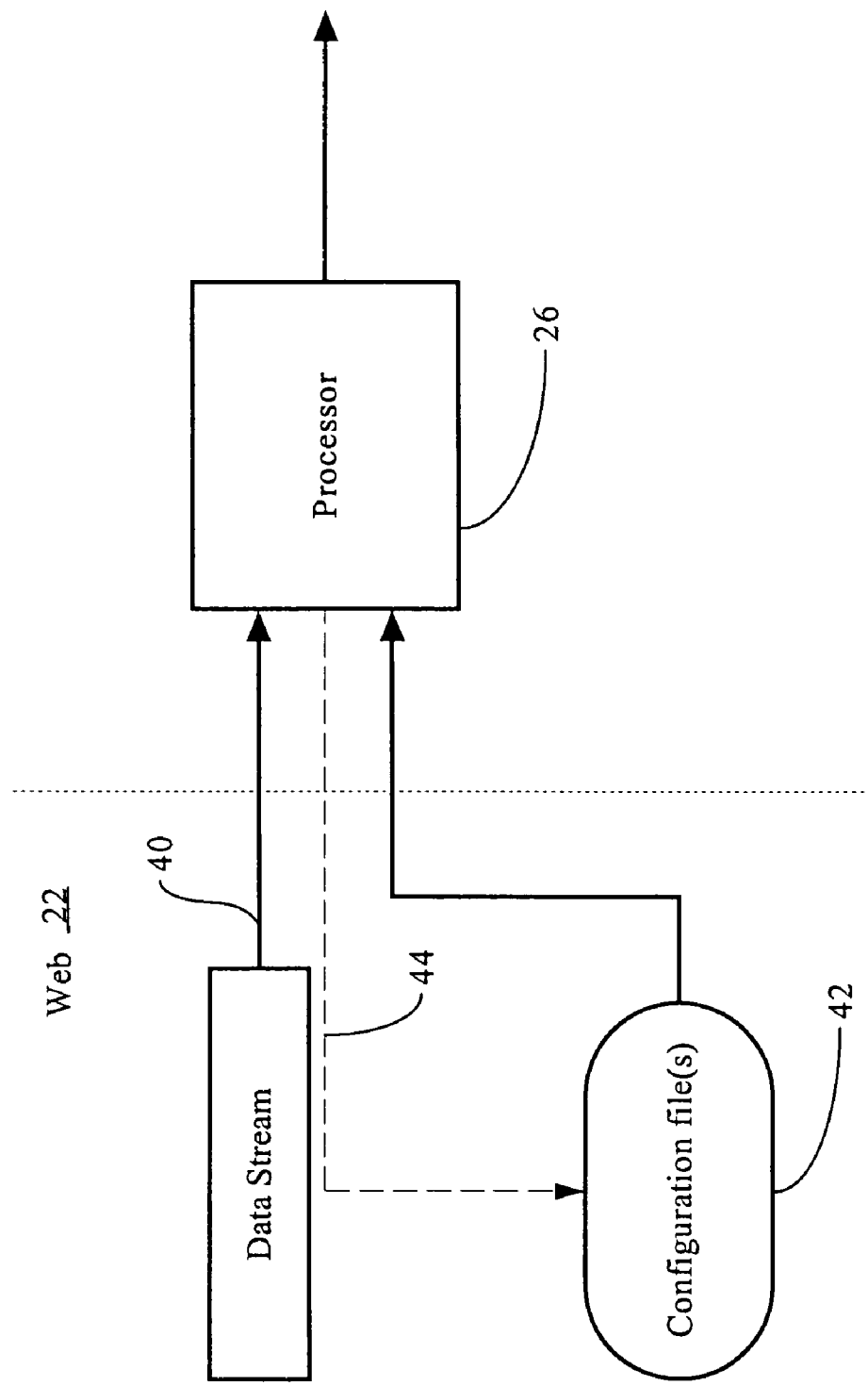
FIG. 2 is a block diagram providing details of a control file access.

FIG. 2 provides details of a control file access. A processor 26 processes the incoming data stream 40. In an illustrative embodiment this data stream 40 is an XML file, however the present invention is applicable to any data input which references a separate description or control file 42 that is required or desirable to perform processing on the data stream 40. Embedded in the data stream 40 is one or more control file identifiers, which identify the name (and optionally the location) for the proper control file 42. In the illustrative embodiment for XML, the control file 42 can by of any type including W3C XML Schema file (.xsd), Data Type Document (DTD) file, RelaxNG file (.rng), Web Services Description Language (WSDL) (.wsdl), W3C XSLT Stylesheet file (.xsl), W3C XQuery document or similar.

In order to process the data stream 40, the processor 26 must access the control file 42. (In some cases, the process 26 may be capable of processing the data stream 40 without the control file, but there is some advantage—such as enhanced security, convenience or performance—to making use of the control file while processing the stream). It accesses the control file 42 by issuing a call 44 out on the web to the remote site where the control file 42 is stored. Once the processor 26 has obtained the control file 42, it can then process and/or validate the data stream 40. The data stream 40 can have multiple control file identifiers within it, and further the control file 42 may have identifiers to other control files (or other support files), therefore this process of accessing can be time consuming and process intensive. This behavior can be used by malicious parties to make a Denial of Service attack against the processor 26, for example an XDoS (XML Denial of Service) attack against XML Schema validator.

Figure 3:
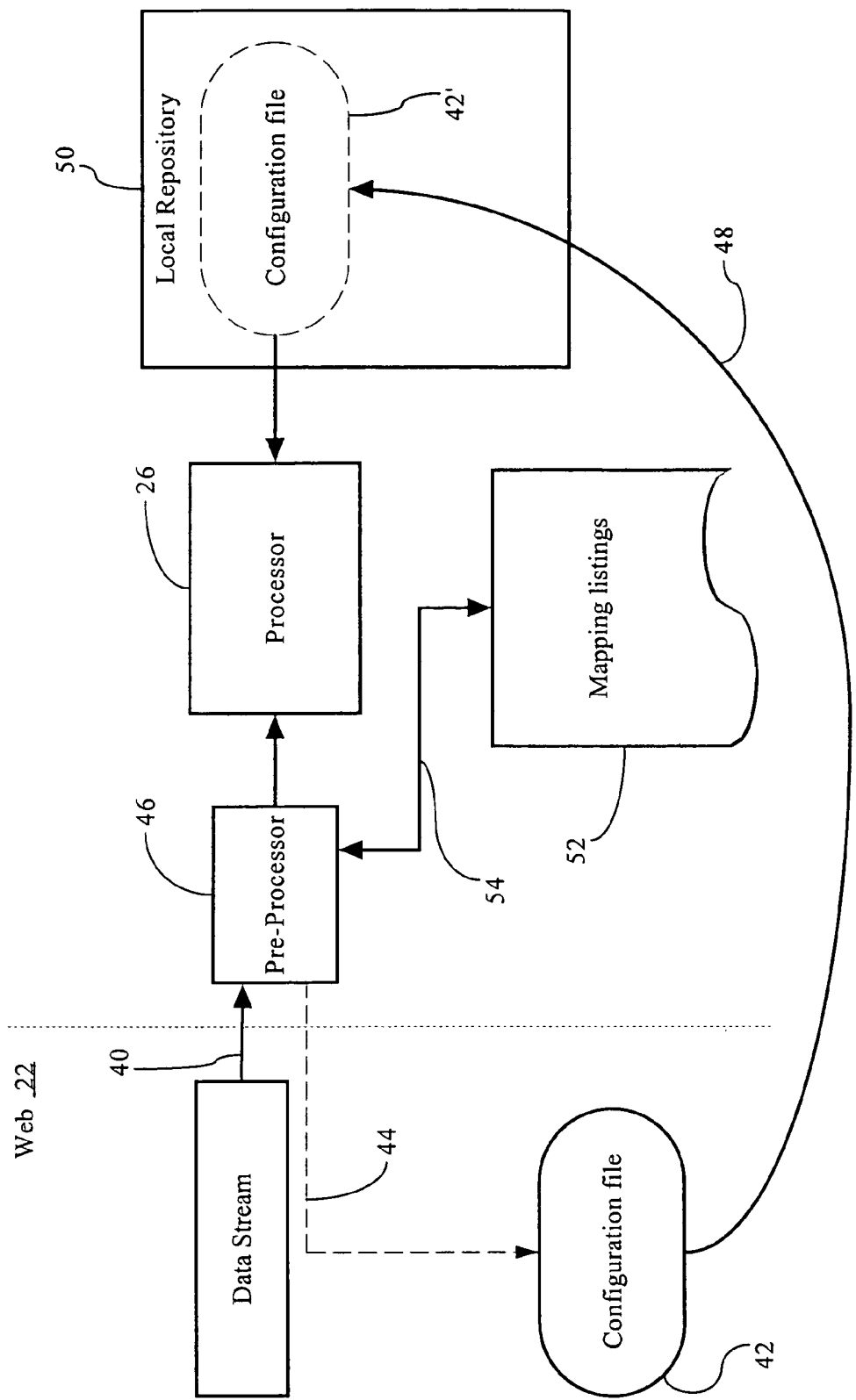
FIG. 3 is a block diagram of a control file access according to the present invention.

A process according to the present invention is illustrated in FIG. 3. A pre-processor 46 scans the data stream 40, to detect control file identifiers. As a control file identifier is encountered, it is transformed into a new identifier that points to a (new) storage location, possibly a local storage location 50. As an optional enhancement, caching can be implemented: If the identified control file 42 is not in the new location 50 yet, the pre-processor 46 retrieves the control file 42 by issuing a call 44 out on the web, using the untransformed (previous) control file identifier. The pre-processor 46 stores the new copy 42' of the control file in the local storage location 50. Although the pre-processor 46 is illustrated as a separate module or process, it is within the scope of the invention that the processor 26 performs all operations.

The pre-processor 46 may also maintain a mapping 52 of the identifier for the control file 42 and the identifier for the local copy of the control file 42'. The mapping 42 allows the pre-processor 46 to process the configuration identifiers faster, and allows other advantages as will be discussed below. The mapping 52 may be ephemeral, in that it only survives during the processing of the data stream 40, or it may be long term, in that all control file identifiers encountered over days or months will be mapped to the local file(s). Updates to the local copies of the control file 42' may be performed using other mechanisms to ensure the local copies are consistent with the original control file 42. As a further enhancement, a meta-control file may contain processing rules to specify when a mapping should be ephemeral, long term (and how long), and what to do in case the control file 42 is not already present in the mapping 52.

The pre-processor 46 then transforms the control file identifier for the control file 42 in the data stream 40 to an identifier for the new control file copy 42'. There are many possible transformation or mapping techniques possible in accordance with the present invention. Using the example of the illustrative embodiment, pattern or regular expression matching can be used to rewrite all URLs (uniform resource locators) to point to a copy within the enterprise 50. As a specific example a URL reference such as <schema xmlns:coffeelist="http://www.w3.org/2001/coffeelist">

<coffee xmlns="http://www.w3.org/2001/coffeelist"
    xmlns:xsi="http://www.w3.org/2001/XMLSchema-instance"
    xsi:schemaLocation="http://www.w3.org/2001/coffeelist/Schema.xsd"> can be rewritten by replacing "http://www.w3.org/2001/" with a local file or network reference such as "/nfs/repository/schemas" or "\\repo\schemas" or other reference within the organization. All control files at "http://www.w3.org/2001/" will be re-mapped locally, and any file or tree structure at the URL can also be easily and automatically created locally. This transformation can be applied to other resource paths as well. An example of a sample namespace URI such as xmlns: saml="urn:oasiS:tc:scc:saml:1.0" can be rewritten using the same approach.

Another tool for transforming control file identifiers according to the illustrative embodiment is the Apache mod-rewrite engine available from the Apache HTTP Server project at the Apache Software Foundation. The mod-rewrite engine provides a rule-based method to rewrite requested URLs on the fly. An example of Apache-style syntax for URL-rewriting for use with an embodiment is:

simple match/replace rule:

RewriteRule ^oldstuff\.html$ newstuff.html look at user-agent header, if it's mozilla, do the next rewrite, which is the last one [L]

RewriteCond %{HTTP_USER_AGENT} ^Mozilla.*

RewriteRule ^/$ /homepage.max.html [L]

However the transformation is performed for the present invention, it greatly increases efficiency. It also provides security protections: The transaction recipient does not have to rely on the remote site (the URL's owner) to prevent tampering, doesn't have to trust the network, etc. Similar mechanism can be used to access XSLT templates declared by an XML document, external DTDs, WSDL or other "control files" that are not part of the data stream and yet "control" its processing in some useful way and would normally not be trusted and yet would be difficult to configure one-by-one. There could be thousands of "control files", e.g. thousands of XSD or XSLT files, the present invention allows all of them to be mapped using one mapping rule to go to a special internal directory—rather than being configured using thousands of special-case rules to map each transaction type to desired trusted XSD or XSLT file.

Other transformations are possible. For example, the pre-processor 46 could hash the URL and get a RDBS lookup key. It would then rewrite the URL to require SSL/TLS. Another transformation would be to rewrite the URL to look for a (detached) XML digital signature and use that to verify the integrity and authorship of the content of the control file 42.

Once the data stream 40 has been so processed, it is then passed on to the processor 26. The processor 26 processes the data stream 40 in the normal fashion, but when it encounters an (altered) control file identifier, the call to obtain the appropriate control file is to the local copy 42'. The processor 26 is no different from before, indeed it is 'ignorant' to the fact that anything is different. The processing of the data stream 40 and control file 42' produce the same results as without the present invention. There may be situations where it is helpful for the processor 26 to know that control file identifiers have been altered, for example if a control file 42 includes a location reference within itself for security or other purposes. The processor 26 can therefore be provided with access or data from the mapping list 52 in order to handle such situations. Alternatively the pre-processor 46 can perform transformations on any such control file self-references to ensure the operations perform correctly.

It is within the scope of the present invention that the control file 42 passes through the pre-processor 46 also, either at the time the control file 42 is transferred to local storage 50, or when the control file 42' is accessed by the processor 26. This allows the pre-processor 46 to also process file references and identifiers within the configuration file, since control files often include other such references and identifiers. This therefore checks for (and perhaps recursively processes) external dependencies, and ensures that "questionable" features are not used, etc.

The illustrative embodiment according to the present invention is more secure and enjoys higher performance because it does not have to rely on retrieving arbitrary control files (e.g., XML schemas) from transaction-supplied locations and instead allows "trusted" control files to be retrieved from within the trust boundary. The system according to the present invention is practical to deploy as it is much easier to configure than the alternative which would require explicit mappings between control files and all possible transaction types. For example, it can be a self-configuring schema validation system, where each transaction can declare itself to be "valid" against a specific set of constraints in a control file—and be verified against a trusted copy of that configuration file. Similarly, an XML document can use an <xsl-stylesheet> processing instruction to refer to a URL of an XSLT or XQuery transform that should be used to transform it. Rather than fetching an arbitrary untrusted XML transformation control file, the invention allows the supplied PI to be remapped to a trusted repository of XML transformation instructions.

Figure 4:
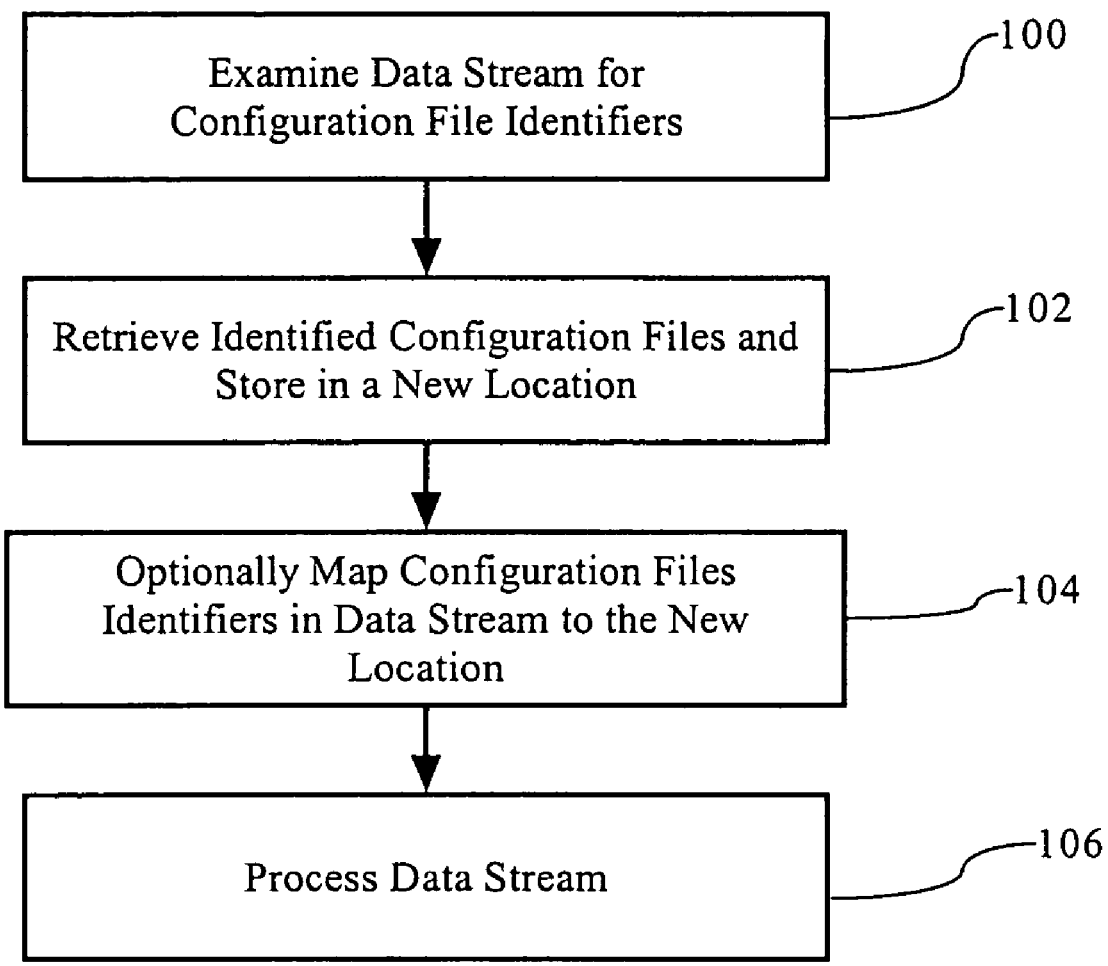
FIG. 4 is a flow chart of steps performed by an illustrative embodiment of the present invention.

The system also has the added benefit that transactions which declare themselves to be valid against a control file that is not recognized can be quickly identified and quarantined, as they may be the result of legitimate changes or misconfiguration. Further, additional flexibility is available by over-riding transaction-declared configurations or modifying control files after they are retrieved The steps according to the illustrative embodiment of the present invention are shown in FIG. 4. At step 100, the data stream is examined, typically at run-time, to detect control file identifiers. Once identified, the control file so identified is retrieved and stored at the new convenient and/or secure location, step 102. The control file identifiers are transformed in the data stream to refer to the new location for the configuration file, step 104. The data stream is then processed in the normal fashion by the processor, step 106. As previously described, variations on this general method are possible and all within the scope of the present invention.

Another embodiment of the present invention works depending on the contents of the control file. While processing the incoming data stream, the control file may indicate if invalid data should be removed, marked and sent along to the target processor, or if an error response should be sent to the data stream originator. This allows for situations where the data stream is not passed on for further processing, but alternate data is passed along. An incoming data stream may reference a schema file that defines the syntax (structure) of the incoming data. The control file may specify an alternate location for that file (for security or efficiency reasons, or both). That alternate schema file may provide default values for fields (XML elements or attributes) missing in the original data stream. In other words, the system can "fill in defaults". As described another option is that the data stream is not passed, but alternate data is sent back to the stream originator. An example of this is that while processing the data, the system verifies the data stream against a schema file located through the control file. If the incoming data stream does not match the schema, then the system stops processing and sends an error response (for example, a SOAP Fault message) to the originator, perhaps indicating that the data is invalid.

In another embodiment of the present invention, the original control file indicators or references in the data stream are not removed, but rather the data stream is augmented to contain new references. For example, XML has an abstract information model known as the Infoset. In this approach, the control file doesn't rewrite schema-file locations, but instead adds additional attributes "dp:trueLocation", for example, that indicate the true location of where the schema file should be found. These are special attributes or annotations on the data stream that would be ignored by the normal business logic.

In another embodiment of the present invention, the control files are protected by digital signatures or other integrity or authentication mechanisms. In order to protect the integrity of the control file, cryptographic techniques such as XML Digital Signature, can be used to guarantee that the file has not been modified, and provide secure indication of who the original author is. For example, standards organizations could provide signed catalogs identifying all their specifications and their official locations. Similarly, the validity of the control file may affect the output processing. As part of the preparation of loading the control file, the system may require content confirmation such as an XML digital signature. If the signature is not present, or fails to validate the control file, additional configuration information may direct the system to reject all requests, approve all requests but annotate them as "not-validated," etc.

The present invention may be implemented in any form including software, firmware or hardware, be implemented by asics (application specific integrated circuits, custom designs, fpga (field programmable gate arrays), and may run on general purpose processing engines, special purpose processors, hardware accelerators, microcontrollers, complex or reduced instruction set processors, network appliances, or any combination thereof. The present invention can be implemented as a standalone product, or embedded within other systems or programs with other utility.

Although the invention has been shown and described with respect to illustrative embodiments thereof, various other changes, omissions and additions in the form and detail thereof may be made therein without departing from the spirit and scope of the invention.

What is claimed is:

1. A method comprising:
    monitoring a document data stream for document control file identifiers;

upon encountering a first control file identifier referring to a first document control file, creating a mapping of the first control file identifier to a new storage location;

transforming the first control file identifier in the document data stream to a second control file identifier;

referring to the new storage location based on the mapping of the first control file identifier;

copying a remote document control file identified by the first control file identifier to a document control file at the new storage location specified by the mapping;

protecting the document control file by one of a digital signature and other authentication mechanism;

authenticating the document control file to provide a trusted copy;

storing the trusted copy of the authenticated document control file at the new storage area located within a trusted repository; and processing the data stream with the second control file identifier, the processing of the data stream comprising:

determining the validity of data in the document data stream using the authenticated document control file stored in the trusted repository; and halting the processing of the data stream in response to instructions included in the authenticated document control file related to processing the data stream.

2. The method of claim 1, wherein the processing of the data stream, in response to an indication by the control file and determining that data in the data stream is invalid against the control file, further includes one of the steps of:

removing the data, marking the data and sending the data to a processor; and sending an error response to an originator of the data stream.

3. The method of claim 1 further comprising processing alternate data in response to halting the processing of the data stream.

4. The method of claim 1 further comprising sending alternate data to an originator of the data stream data in response to halting the processing of the data stream.

5. The method of claim 1, wherein the first control file identifier is removed from the data stream.

6. The method of claim 1, wherein the document data stream includes data in XML format, and the document control file is one of: an XML Schema file, Data Type Document (DTD) file, RelaxNG file, Web Services Description Language (WSDL) file, W3C XSLT Stylesheet file, W3C XQuery document and an XML Catalog.

7. The method of claim 1, wherein a validity indication for the control file may change the processing of the data stream.

8. The method of claim 1, wherein the monitoring and transforming of control file identifiers is performed using regular expression matching.

9. A system for processing an incoming document data stream, the system comprising:

a pre-processor in communication with the incoming data stream, the pre-processor configured to perform the steps of:

monitoring a document data stream for control file identifiers;

upon encountering a first control file identifier referring to a first document control file, creating a mapping of the first control file identifier to a new storage location;

transforming the first control file identifier in the document data stream to a second control file identifier that refers to the new storage location specified by the mapping;

in the data stream, transforming the first control file identifier to the second control file identifier referring to the new storage location based on the mapping of the first control file identifier;

copying a remote document control file identified by the first control file identifier, in real time, to a document control file at the new storage location specified by the mapping;

protecting the document control file by one of a digital signature and other authentication mechanism;

authenticating the document control file;

storing the authenticated document control file at the new storage area located within a trusted repository;

processing the data stream with the second control file identifier, the processing of the data stream comprising:

determining the validity of data in the document data stream against the protected document control file; and in response to an indication by the control file and determining that data in the data stream is invalid against the control file removing the data, performing one of the steps of:

marking the data and sending the data to a processor; and sending an error response to an originator of the data stream.

10. The system of claim 9, wherein in response to instructions included in the control file, the processing of the data stream further includes halting the processing of the data stream and processing alternate data.

11. The system of claim 9, wherein in response to instructions included in the control file, the processing of the data stream further includes halting the processing and sending alternate data to an originator of the data stream.

12. The system of claim 9, wherein the first control file identifier is removed from the data stream.

13. The system of claim 9, wherein the document data stream includes data in XML format, and the control file is one of: an XML Schema file, Data Type Document (DTD) file, RelaxNG file, Web Services Description Language (WSDL) file, W3C XSLT Stylesheet file, W3C XQuery document and an XML Catalog.

14. The system of claim 9, wherein the control file is protected by one of: a digital signature and other integrity and authentication mechanisms.

15. The system of claim 9, wherein a validity indication for the control file may change the processing of the data stream.

16. The system of claim 9, wherein the monitoring and transforming of control file identifiers is performed using regular expression matching.

17. A network appliance for use as an XML firewall, the network appliance comprising:

at least one processor, the at least one processor configured to perform the steps of:

monitoring a document data stream including transactions in XML format for XML schema file identifiers;

upon detecting a first XML schema file identifier, transforming the first XML schema file identifier into a second file identifier based on a mapping to a storage location different from a storage location indicated by the first XML schema file identifier;

obtaining an XML schema file identified by the first XML schema file identifier, copying the XML schema across the firewall and storing the XML schema file, in real time, in said storage location based on the mapping;

protecting the stored XML schema file by one of a digital signature and other authentication mechanism;

authenticating the document control file; and storing the authenticated document control file at the new storage area located within a trusted repository;

determining whether transactions in the data stream are valid using the protected stored XML schema file; and in response to indications in the control file and determining that transactions in the data stream are invalid against the XML schema file, the at least one processor performs one of the steps of:

removing the transaction;

marking the transaction; and sending an error response to an originator of the data stream.

18. The method of claim 1, further comprising processing the control file, the processing of the control file including the processing of file references and identifiers within the control file.

19. The method of claim 9, further comprising processing the control file, the processing of the control file including the processing of file references and identifiers within the control file.

20. The method of claim 1, further comprising:

retrieving the trusted copy of the document control file from within the trust boundary; and reusing the trusted copied control file.

21. The method of claim 1, wherein the trusted repository is within a trusted boundary.

22. The method of claim 1, wherein copying the remote document control file further comprises optionally caching portions of the remote document control file.

23. The method of claim 1, wherein the first control file identifier is specified by a first uniform resource locator (URL) and the second control file identifier is specified at run-time by a second URL.

* * * * *